(12) United States Patent
Mahalingaiah

(10) Patent No.: US 6,212,621 B1
(45) Date of Patent: Apr. 3, 2001

(54) METHOD AND SYSTEM USING TAGGED INSTRUCTIONS TO ALLOW OUT-OF-PROGRAM-ORDER INSTRUCTION DECODING

(76) Inventor: Rupaka Mahalingaiah, 6503 Farmdale La., Austin, TX (US) 78749

(*) Notice: Subject to any disclaimer, the term of this patent is extended or adjusted under 35 U.S.C. 154(b) by 0 days.

(21) Appl. No.: 09/104,047

(22) Filed: Jun. 24, 1998

(51) Int. Cl.[7] .................................................. C06F 9/30
(52) U.S. Cl. ........................ 712/212; 712/200; 712/210
(58) Field of Search ............................ 711/201; 712/200, 712/204, 210, 211, 215, 216, 218, 23, 212

(56) References Cited

U.S. PATENT DOCUMENTS

| | | | |
|---|---|---|---|
| 4,747,043 | 5/1988 | Rodman | 711/124 |
| 4,942,519 | 7/1990 | Nakayama | 710/110 |
| 5,214,769 | 5/1993 | Uchida et al. | 711/151 |
| 5,655,096 | * 8/1997 | Branigin | 712/200 |
| 5,748,978 | * 5/1998 | Narayan et al. | 712/23 |
| 5,751,981 | 5/1998 | Witt et al. | 712/204 |
| 5,752,264 | 5/1998 | Blake et al. | 711/144 |
| 5,822,559 | * 10/1998 | Narayan et al. | 712/214 |

OTHER PUBLICATIONS

John L Hennessy & David A Patterson, "Computer Architecture A Quatitative Approch," 1990, pp. 408–414.

Intel Pentium Family User's Manual, vol. 2: 82496/82497 Cache Controller and 82491/82492 Cache SRAM Data Book, 1994 (Intel Order No. 241429–003), pp. 5–30 through 5–31.

* cited by examiner

*Primary Examiner*—John Follansbee
*Assistant Examiner*—Walter Benson

(57) ABSTRACT

A microprocessor configured to allow instructions to be decoded out of order is disclosed. The microprocessor is configured to assign fetch tags to groups of instruction bytes as they are fetched from an instruction cache. The instructions are then aligned and decoded. Multiple decode units may be used in parallel to perform the aligning and decoding. As the groups of instruction bytes are aligned and decoded, a separate instruction counter is maintained for each group. The instruction counters identify the number of instructions decoded within each group. Instruction tags are formed by appending the instruction counter values to the fetch tags. The instruction tags serve to identify the relative position of each decoded instruction in program order. After decoding, the instructions are stored in a reordering storage unit. The reordering storage unit allows the instructions to be reordered for dependency checking. A method for decoding instructions out of order is also disclosed. In the method, instruction bytes are fetched from a cache, assigned a fetch tag, and decoded into individual instructions. Instruction tags are then assigned to each instruction to allow reordering before execution.

20 Claims, 8 Drawing Sheets

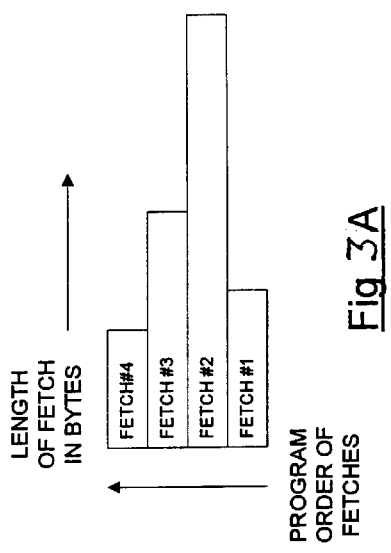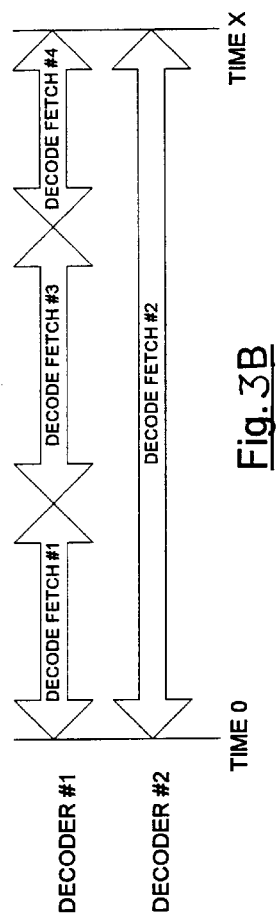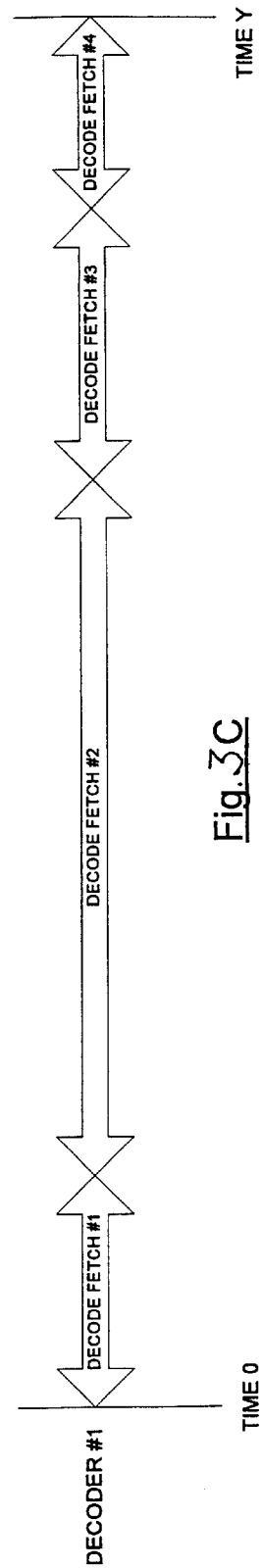
Fig. 3A
Fig. 3B
Fig. 3C

METHOD AND SYSTEM USING TAGGED INSTRUCTIONS TO ALLOW OUT-OF-PROGRAM-ORDER INSTRUCTION DECODING

BACKGROUND OF THE INVENTION

1. Field of the Invention

This invention relates to microprocessors and, more particularly, to decoding variable length instructions within a microprocessor.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable length instructions. A generic format illustrative of the x86 instruction set is shown in FIG. 1. As illustrated in the figure, an x86 instruction consists of from zero to four optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes.

For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86 compatible superscalar microprocessors. In particular, the variable length of x86 instructions makes decoding instructions difficult. Decoding instructions typically involves determining the boundaries of an instruction and then identifying each field within the instruction, e.g., the opcode and operands.

One method for determining the boundaries of instructions involves generating a number of predecode bits for each instruction byte read from main memory. The predecode bits provide information about the instruction byte they are associated with. For example, an asserted predecode start bit indicates that the associated instruction byte is the first byte of an instruction. Similarly, an asserted predecode end bit indicates that the associated instruction byte is the last byte of an instruction. Once the predecode bits for a particular instruction byte are calculated, they are stored together with the instruction byte in an instruction cache. When a "fetch" is performed, i.e., a number of instruction bytes are read from the instruction cache, the associated start and end bits are also read. The start and end bits may then be used to generate valid masks for the individual instructions with the fetch. A valid mask is a series of bits in which each bit corresponds to a particular instruction byte. Valid mask bits associated with the first byte of an instruction, the last byte of the instruction, and all bytes in between the first and last bytes of the instruction are asserted. All other valid mask bits are not asserted. Turning now to FIG. 2, an exemplary valid mask is shown. The figure illustrates a portion of a fetch 120 and its associated start and end bits 122 and 124. Assuming the valid mask for instruction B 128 is to be generated, start and end bits 122 and 124 would be used to generate valid mask 126. Valid mask 126 could then be used to mask off all bytes within fetch 120 that are not part of instruction B 128.

Once the boundaries of an instruction have been determined, the fields within the instruction, e.g., the opcode and operand fields, may be identified. Once again, the variable length of x86 instructions complicates the identification process. In addition, the optional prefix bytes within an x86 instruction create further complications. For example, in some instructions the opcode will begin with the first byte of the instruction, while others may begin with the fourth byte.

To perform the difficult task of decoding x86 instructions, a number of cascaded levels of logic are typically used. Thus decoding may require a number of clock cycles and create a significant delay before any instructions are available to the functional stages of the microprocessor's pipeline. As microprocessors increase the number of instructions they are able to execute per clock cycle, instruction decoding may become a performance limiting factor. Therefore, an improved mechanism for rapidly decoding large numbers of instructions is needed.

SUMMARY OF THE INVENTION

The problems outlined above are in large part solved by an instruction alignment and decode unit capable of out of order decoding. By allowing instructions to be decoded out of order, multiple decoders may be efficiently utilized in parallel, thereby reducing overall decode times. The possible performance advantages of out of order decoding are illustrated in FIGS. 3A–3C. FIG. 3A represents a number of fetches performed in program order to a cache. Each fetch may contain a varying number of instructions, and each instruction may vary in byte length. As a result, longer fetches may require more clock cycles to decode than short fetches. FIG. 3B is a timing diagram illustrating one possible timing relationship for two decoders that are capable of performing out of order decoding. In contrast, FIG. 3C illustrates the prior art method for decoding fetches, i.e., each fetch is decoded in order. Out of order decoding may be accomplished by assigning tags to fetches and to decoded instructions within each fetch. The tags may then be used to reorder the instructions after decode so that proper dependency checking may still be performed.

In one embodiment, a microprocessor configured to perform out of order decoding comprises a cache, a tag generator, and a decode unit. The instruction cache is configured to receive a fetch address and in response output a group of instruction bytes corresponding to the fetch address. The tag generator is coupled to the instruction cache and is configured to generate a fetch tag for the group of instructions bytes. The decode unit is coupled to the tag generator and the instruction cache. The decode unit is configured to receive the group of instruction bytes, and decode them into one or more instructions. The decode unit is also configured to generate an instruction tag for each decoded instruction that is indicative of the instruction's position in program order. The instruction tags may be used to reorder the decoded instructions for dependency checking. Advantageously, this configuration allows for efficient out of order decoding of instructions from different fetches.

In another embodiment, the microprocessor comprises a cache and two decode units, both of which are coupled to the cache. The first decode unit is configured to receive and decode a first group of instruction bytes from the instruction cache. In parallel, the second decode unit is configured to receive and decode of a second group of instruction bytes which occur after the first group in program order. The second decode unit may be configured to complete decoding before the first decode unit has completed decoding the first group of instructions. The second decode unit may also be configured to begin decoding a third group of instructions before the first decode unit has completed decoding the first group of instructions. Advantageously, this configuration may prevent the decode units from stalling when subsequent groups of instruction bytes are decoded more quickly than earlier groups.

A method for decoding instructions out of order is also contemplated. In one embodiment, the method comprises fetching a group of instruction bytes from an instruction cache and assigning a fetch tag to the group. The group is decoded into a number of individual instructions, and each individual instruction is assigned an instruction tag. The individual instructions may be issued for execution once all preceding instructions (in program order) have been decoded.

BRIEF DESCRIPTION OF THE DRAWINGS

Other objects and advantages of the invention will become apparent upon reading the following detailed description and upon reference to the accompanying drawings in which:

FIG. 3A is a block diagram illustrating a number of fetches.

FIG. 3B is a timing diagram illustrating one possible timing relationship between two decoders capable of out of order decoding.

FIG. 3C is a timing diagram illustrating decoding fetches in order.

Figure 1:
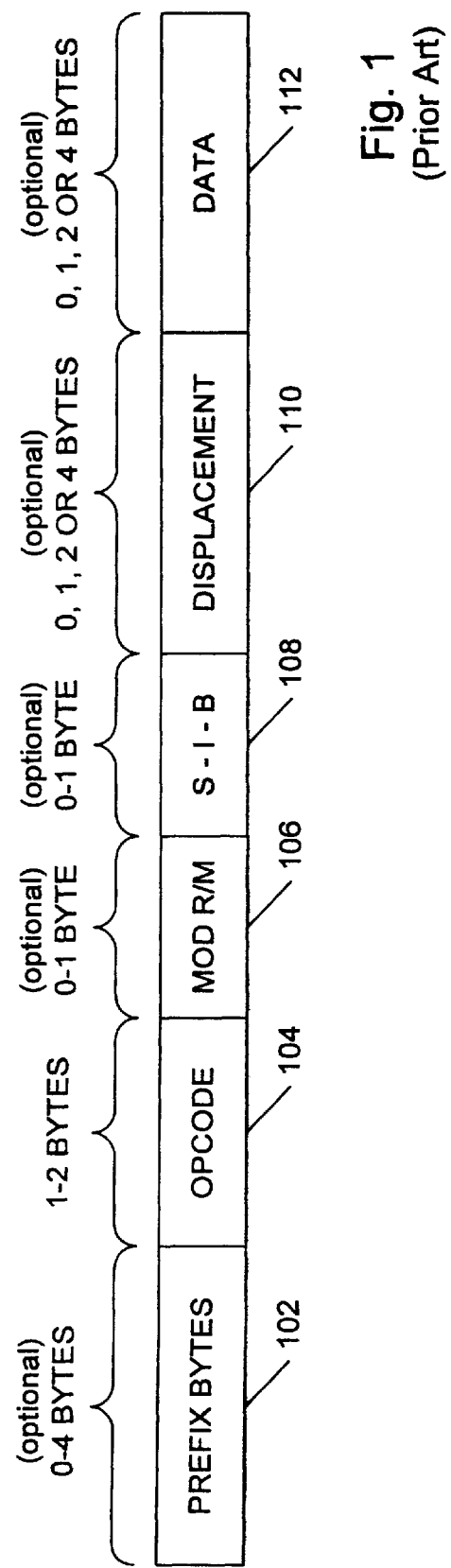
FIG. 1 is a block diagram of a generic x86 instruction format.
Figure 2:
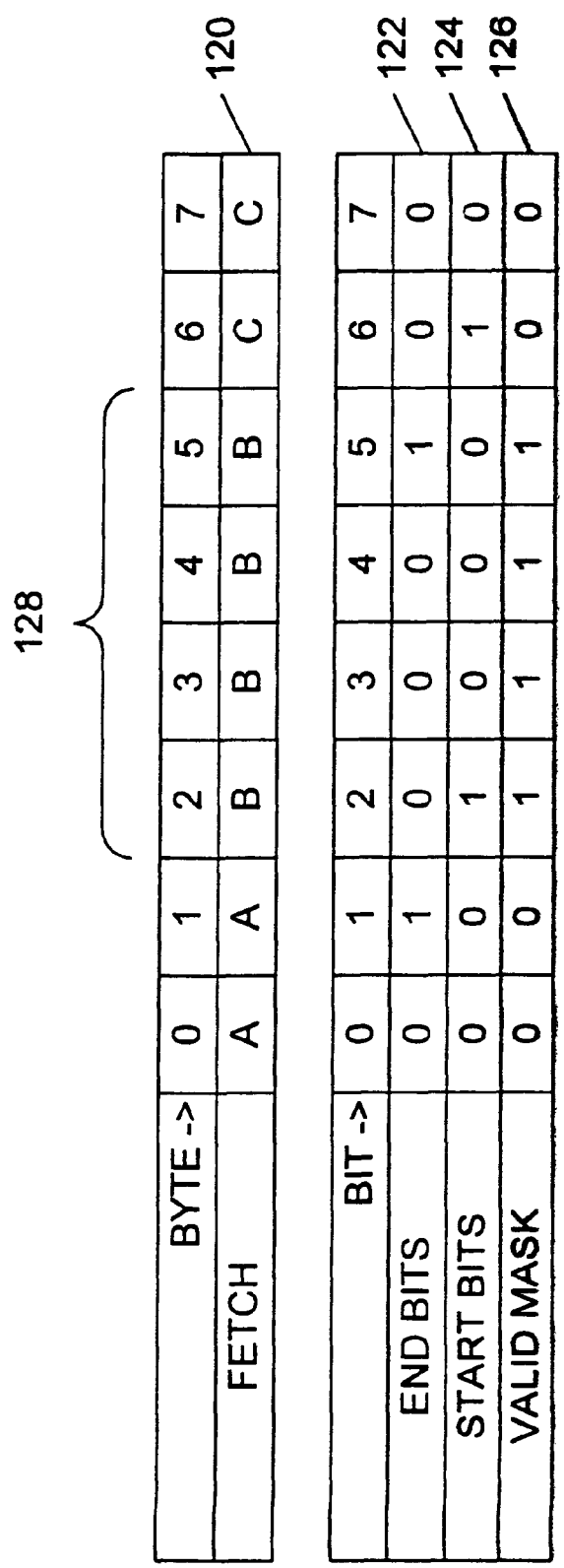
FIG. 2 is a block diagram illustrating a valid mask.

While the invention is susceptible to various modifications and alternative forms, specific embodiments thereof are shown by way of example in the drawings and will be described in detail herein. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
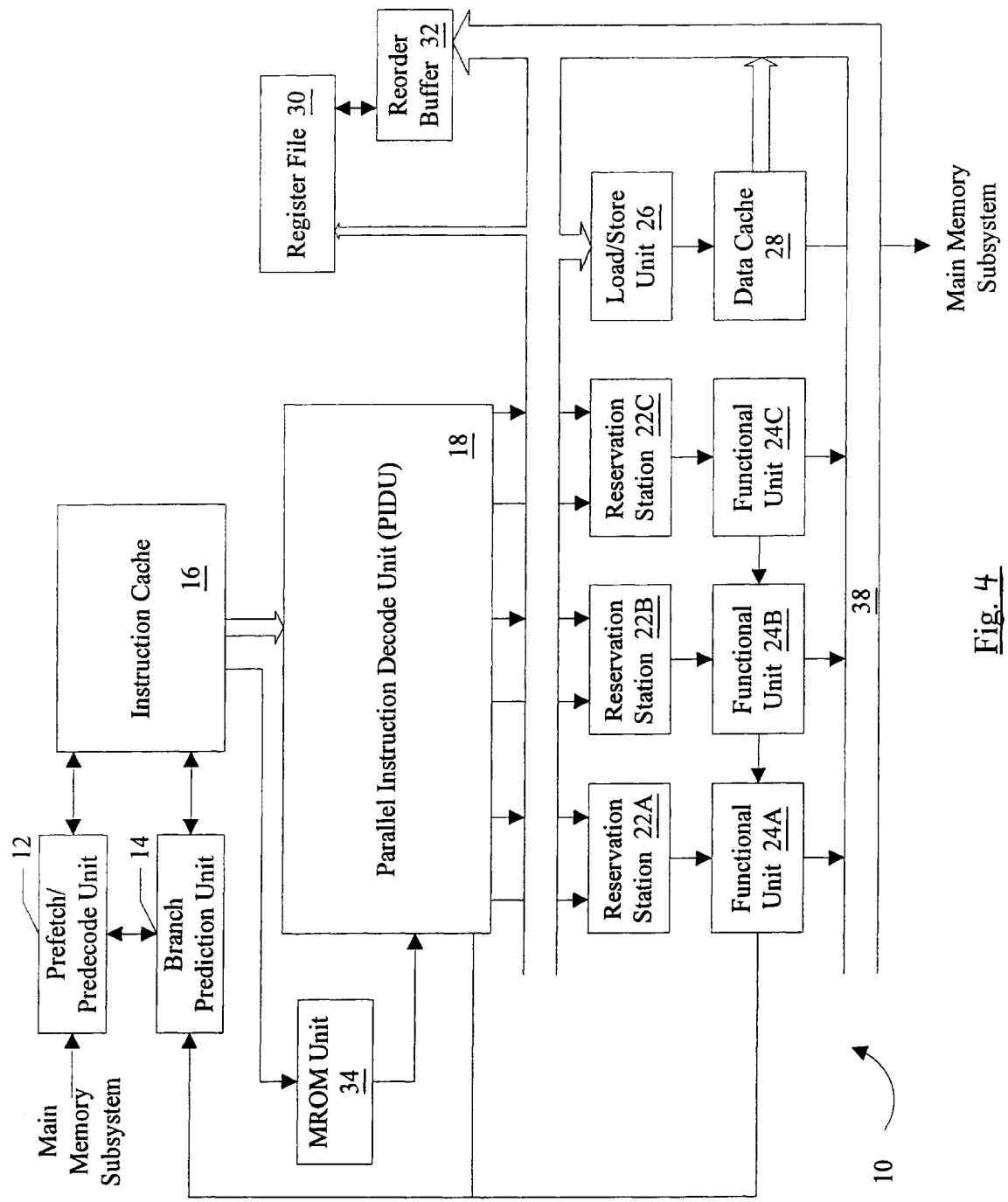
FIG. 4 is a block diagram of one embodiment of a superscalar microprocessor.

Turning now to FIG. 4, a block diagram of one embodiment of a microprocessor 10 is shown. Microprocessor 10 includes a prefetch/predecode unit 12, a branch prediction unit 14, an instruction cache 16, a parallel instruction decode unit (PIDU) 18, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter may be collectively referred to by the reference number alone. For example, reservation stations 22A–22C may be collectively referred to as reservation stations 22.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to PIDU 18 and functional units 24. Instruction cache 16 is further coupled to MROM unit 34 and PIDU 18. PIDU 18 is in turn coupled to load/store unit 26 and to respective reservation stations 22A–22C. Reservation stations 22A–22C are further coupled to respective functional units 24A–24C. Additionally, PIDU 18 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to PIDU 18.

Instruction cache 16 is a high speed cache memory provided to store instructions. Instructions are fetched from instruction cache 16 and forwarded to PIDU 18. In one embodiment, instruction cache 16 is configured to store up to 64 kilobytes of instructions in a 4-way set associative structure having 32-byte lines (a byte comprises 8 binary bits). Alternatively, 2-way set associativity may be employed as well as any other desired associativity. Instruction cache 16 may additionally employ a way prediction scheme in order to speed access times to the instruction cache 16. For example, instead of accessing tags identifying each line of instructions and comparing the tags to the fetch address to select a way, instruction cache 16 may predict the way that is accessed. In this manner, the way is speculatively selected prior to accessing the array. Using way prediction, the access time of instruction cache 16 may be similar to a direct-mapped cache. After the instruction bytes have been read, a tag comparison is performed for verification. If the way prediction is incorrect, the correct instruction bytes are fetched and the incorrect instruction bytes (which are further down the processing pipeline) are discarded. It is noted that instruction cache 16 may be implemented as a fully associative, set associative, or direct mapped configuration.

Instructions are prefetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates a number of predecode bits for each byte of the instructions, e.g., a start bit, an end bit, and a functional bit. The predecode bits form tags indicative of the boundaries of each instruction. The predecode tags may also convey additional information such as whether a given instruction can be decoded directly by PIDU 18 or whether the instruction is executed by invoking a microcode procedure controlled by MROM unit 34. Still further, prefetch/predecode unit 12 may be configured to detect branch instructions and to store branch prediction information into branch prediction unit 14.

One possible encoding of the predecode tags for microprocessor 10 is described below. In the exemplary encoding, if a particular byte is the first byte of an instruction, the start bit for that byte is set. Similarly, if the byte is the last byte of an instruction, the end bit for that byte is set. The third exemplary predecode bit is the functional bit, which distinguishes instructions which may be directly decoded by PIDU 18, i.e., "fast path" instructions, and the remaining x86 instructions, i.e., MROM instructions. For fast path instructions, the functional bit may be set for each prefix byte included in the instruction, and cleared for other bytes. For MROM instructions, the functional bit may be cleared for each prefix byte and set for other bytes. Thus, the type of instruction may be determined by examining the functional bit corresponding to the last byte in the instruction. If that functional bit is clear, the instruction is a fast path instruction. Conversely, if that functional bit is set, the instruction is an MROM instruction. This encoding also allows the opcode in a fast past instruction to be easily located. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decoding by PIDU 18 and are therefore executed by invoking MROM unit 34. More specifically, when an MROM instruction is encountered, MROM unit 34 parses and translates the MROM instruction into a subset of defined fast path instructions to effectuate the desired operation. MROM unit 34 dispatches the subset of fast path instructions to PIDU 18.

Before proceeding with a detailed description of PIDU 18, general aspects regarding exemplary superscalar microprocessor 10 of FIG. 4 will be described. Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16-byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched to branch prediction unit 14. This allows branch prediction unit 14 to determine which branch target addresses to select when forming a branch prediction. PIDU 18 and functional units 24 provide update information to branch prediction unit 14. Because branch prediction unit 14 stores two targets per 16-byte portion of the cache line, some branch instructions within the line may not be stored in branch prediction unit 14. PIDU 18 detects branch instructions which were not predicted by branch prediction unit 14. Functional units 24 execute the branch instructions and determine if the predicted branch direction was mispredicted. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

As previously noted, instruction bytes fetched from instruction cache 16 are conveyed to PIDU 18. As the instruction bytes are fetched, the corresponding predecode data is also provided to PIDU 18 (and to MROM unit 34). PIDU 18 utilizes the predecode data to align and decode instructions within the fetched instruction bytes. Register operand information is also detected and routed to register file 30 and reorder buffer 32. Additionally, if the instructions require one or more memory operations to be performed, PIDU 18 dispatches the memory operations to load/store unit 26. Each decoded instruction is dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise"(i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exceptioncausing instruction, in which case the speculative results may be discarded by reorder buffer 32.

The decoded instructions and immediate or displacement data provided at the outputs of PIDU 18 are routed directly to respective reservation stations 22. In one embodiment, each reservation station 22 is capable of holding instruction information (i.e., decoded instructions as well as operand values, operand tags and/or immediate data) for up to three pending instructions awaiting issue to the corresponding functional unit. It is noted that for the embodiment of FIG. 4, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32-bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32-bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions whenever one or more instructions are dispatched by PIDU 18. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes a fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. When the buffer is full, PIDU 18 waits until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 5:
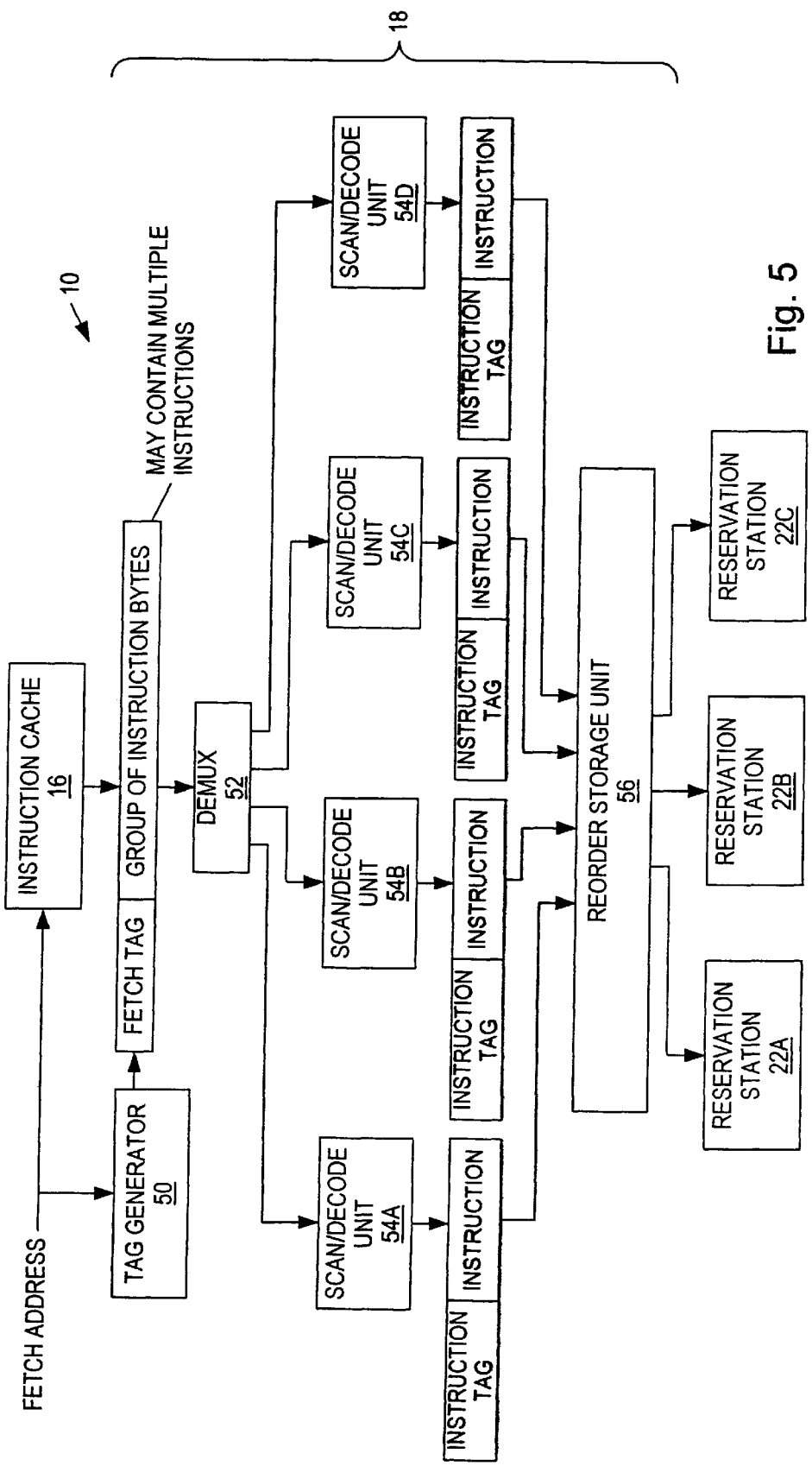
FIG. 5 is a block diagram of one embodiment of the parallel instruction decode unit from FIG. 4.

Turning now to FIG. 5, more detail of one embodiment of PIDU 18 is shown. In this embodiment, PIDU 18 comprises a tag generator 50, a demultiplexer 52, decode units 54A–54D and a reordering storage unit 56. Tag generator 50 is coupled to demultiplexer 52, which is in turn coupled to decode units 54A–54D. Decode units 54A–54D are coupled to reordering storage unit 56 which is in turn coupled to reservation stations 22A–22C.

When instruction cache 16 receives a fetch address, it outputs a number of instruction bytes from a cache line that corresponds to the fetch address. The number of instruction bytes output may be determined by the length of the cache line, the fetch address's offset into the cache line, and the presence of any branch instructions within the cache line. The instruction bytes output by instruction cache 16 are collectively referred to herein as a "group." The group of instruction bytes may thus range in length from one byte up to the length of an entire cache line. Each group may contain multiple instructions. As previously noted, groups with larger numbers of instructions may take longer to decode than shorter groups.

When instruction cache 16 receives a fetch address, tag generator 50 also receives the fetch address. In response, tag generator 50 generates and outputs a "fetch tag." The fetch tag identifies the relative order in which the aforementioned groups of instruction bytes are output from instruction cache 16. In one embodiment, tag generator 50 may comprise a 2-bit counter configured to increment its output by one for each fetch address it receives. The number of bits used for the fetch tag may be configured to be equal to or great than the number of pipeline stages within PIDU 18. Advantageously, this may allows multiple groups of instruction bytes to be decoded out of order while still allowing the decoded instructions to be reordered for dependency checking. The following table illustrates an example of the operation of the 2-bit counter embodiment of tag generator 50.

|  | Tag generator 50 output (i.e., fetch tag) | Instruction cache 16 output (i.e., group of instruction bytes) |
| --- | --- | --- |
| fetch #1 | 00 | B3 FF E8 08 00 |
| fetch #2 | 01 | 56 EB EC |
| fetch #3 | 10 | C3 |
| fetch #4 | 11 | A1 26 99 B4 41 . . . |
| fetch #5 | 00 | 34 00 BE B9 98 . . . |

After instruction cache 16 has output a group of instruction bytes and tag generator 50 has generated the group's fetch tag, demultiplexer 52 is configured to receive the fetch tag and the group of instruction bytes and route them to the first available decode unit 54A–54D. Decode units 54A–54D are configured to receive the instruction bytes from demultiplexer 52, scan them for predecode information, and then align and decode the instruction bytes into individual instructions.

As decode units 54A–54D are aligning and decoding instructions, each decode unit maintains in internal count of the number of instructions it has decoded for each group of instruction bytes (i.e., each fetch). This internal count value is then appended to the group's fetch tag to generate an instruction tag for each individual instruction. The instruction tag identifies each instruction's order within the group. As decode units 54A–54D decode instructions, the instructions (and their corresponding instruction tags) are output to reordering storage unit 56. Reordering storage unit 56 is configured to store the decoded instructions until they are issued to reservation stations 22A–22C. An instruction is not issued unless all instructions occurring before it (in program order) have been decoded.

Note that while the figures and examples illustrate PIDU 18 as having four decode units 54A–54C, other numbers are possible, e.g., two decoders. Furthermore, in one embodiment, each fetch from instruction cache 16 may be divided into multiple groups of instruction bytes. Each group may then be assigned a different fetch tag and be directed by demultiplexer 52 to a different decode unit 54A–54C. Advantageously, this embodiment may allow longer fetches to be decoded more quickly.

Figure 6:
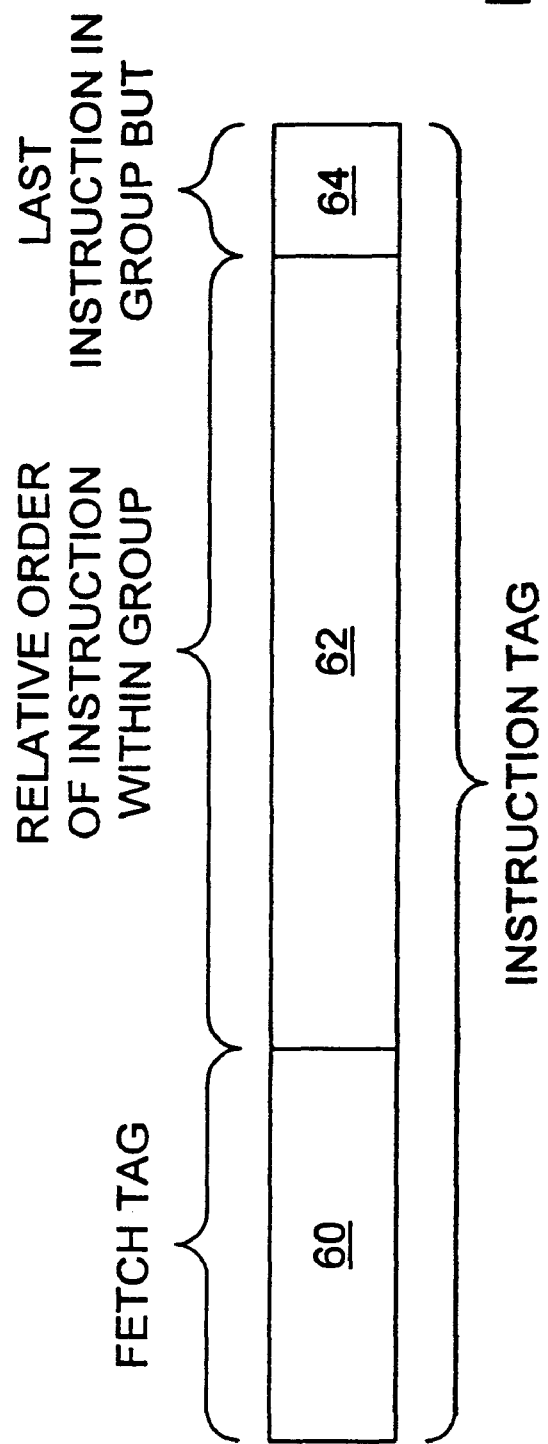
FIG. 6 is a diagram showing one embodiment of an instruction tag.

Turning now to FIG. 6, one possible format for the instruction tag is shown. As illustrated, the instruction tag may comprise three fields, a fetch tag field 60, an instruction order field 62, and a last-instruction-in-group bit 64. Fetch tag field 60 designates the group from which the instruction came, while instruction order field 62 designates the relative position of the instruction within the group. The last-instruction-in-group bit 64 is cleared for all instructions except the last instruction within the group, i.e., it indicates the final instruction of the group. The tables below illustrates how instruction tags may be calculated for two particular groups of instruction bytes (assuming a 2-bit fetch tag field 60 and a 4bit instruction order field 62).

| Instruction Bytes | Instruction | Instruction Tag |
| --- | --- | --- |
| FetchTag = 01; Group of Instruction Bytes = B3 FF BA FC 97 B4 41 EB EC | | |
| B3 FF | MOV BL, FF | 01 0000 0 |
| BA FC 97 | MOV DX, 97FC | 01 0001 0 |
| B4 41 | MOV AH, 41 | 01 0010 0 |
| EB EC | JMP 00F9 | 01 0011 1 |
| Fetch Tag = 10; Group of Instruction Bytes = A4 8B C5 C3 | | |
| A4 | MOV SB | 10 0000 0 |
| 8B C5 | MOV AX, BP | 10 0001 0 |
| C3 | RET | 10 0010 1 |

Note that while the examples above use a 7-bit instruction tag (i.e., a 2-bit fetch tag, a 4-bit instruction ordering value, and a single last-instruction-in-group bit), other configurations are possible, e.g., an 8-bit instruction tag having a 3-bit fetch tag.

Figure 7:
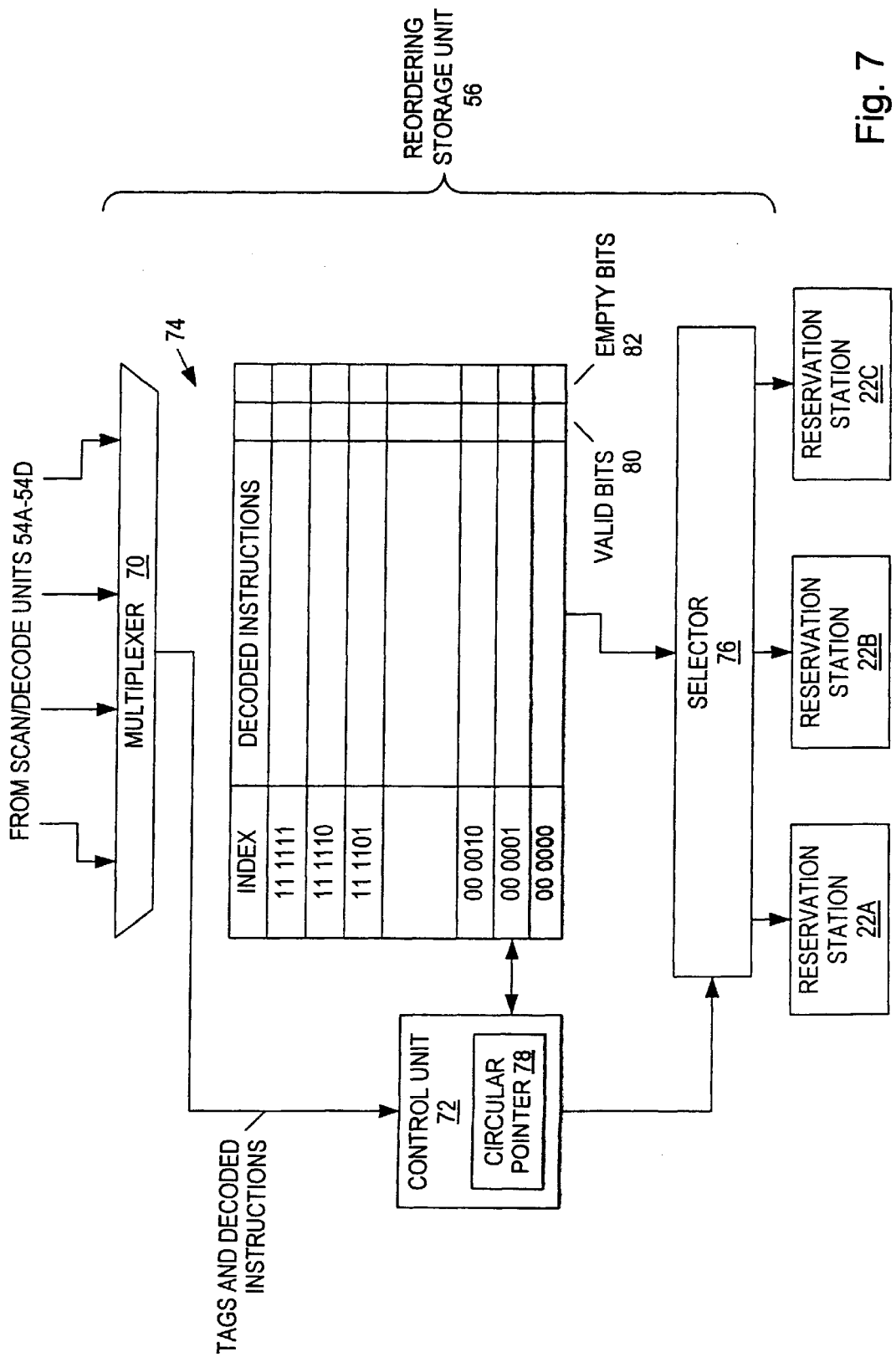
FIG. 7 is a block diagram of one embodiment of the reorder storage unit from FIG. 5.

Turning now to FIG. 7, details of one embodiment of reordering storage unit 56 are shown. Reordering storage unit 56 is configured to reorder instructions after they have been decoded out of order. Reordering storage 56 comprises multiplexer 70, control unit 72, instruction storage unit 74, and selector 76. Control unit 72 is coupled to multiplexer 70, instruction storage unit 74, and selector 76. Selector 76 is in turn coupled to reservation stations 22A–22C and load store unit 26 (see FIG. 4).

Multiplexer 70 is configured to receive and select decoded instructions and instruction tags from decode units 54A–54D. The selected tags and instructions are conveyed to control unit 72, which stores the instructions into instruction storage 74 according to their tags. Instruction storage 74 is configured as a circular buffer. Control unit 72 maintains circular pointer 78 which points to the storage location at the end of the circular buffer. Using circular pointer 78 as a starting point, control unit 72 scans instruction storage unit 74 and conveys selected instructions to selector 76. Selector 76 then routes each selected instruction to the appropriate reservation station 22A–22C (or load/store unit 26) based upon the functional requirements of the decoded instruction.

In one embodiment, each storage location within instruction storage unit 74 is configured with an index value. Control unit 72 may be configured to store each instruction into the storage location having an index value corresponding to the instruction's instruction tag (without the last-instruction-in-group bit). Control unit 72 may also be configured to maintain certain status bits for each storage location, e.g., valid bits 80 and empty bits 82. The examples below describes how one embodiment of control unit 72 may be configured to operate for storing and issuing instructions.

Storing Instructions

1. Control unit 72 receives an instruction having an instruction tag of 01 0000 0. Control unit 72 stores the instruction into the storage location having an index of 01 0000, and then sets the associated valid bit 80 and clears the associated empty bit 82.

2. Control unit 72 receives an instruction having an instruction tag of 01 0001 1 (note the last-instruction-in group bit is set). Control unit 72 stores the instruction into the storage location having an index of 01 0001, sets the associated valid bit 80, and clears the associated empty bit 82. Control unit 72 then sets the valid bits 80 and the empty bits 82 for storage locations 01 0010 through 01 1111. This indicates that there are no instructions having a fetch tag of 01 remaining to be decoded.

3. Control unit 72 receives an instruction having an instruction tag of 10 0000 0. Control unit 72 stores the instruction into the storage location having an index of 10 000, clears the associated empty bit 82, and sets the associated valid bit 80.

Issuing Instructions

Pointer 78 is maintained by control unit 72 so that pointer 78 always points to the last location in the circular buffer. Assuming pointer 78 stores the binary value 10 0000, control unit 72 reads the status bits of the storage location having an index of 10 0000. The following table describes the possible states for the valid and empty bits 80 and 82 and the corresponding actions taken by control unit 72.

| Valid Bit 80 | Empty Bit 82 | Action taken by Control Unit 72 |
| --- | --- | --- |
| 0 | 0 | This state should not normally occur, i.e., it is an error state. |
| 0 | 1 | Control unit 72 waits until this instruction storage location becomes valid before issuing any more instructions. |
| 1 | 0 | Control unit 72 issues the instruction to selector 72, clears the valid bit, sets the empty bit, and increments pointer 78. |
| 1 | 1 | Control unit 72 clears the valid bit, sets the empty bit, and increments pointer 78. |

Advantageously, this configuration of reorder storage 56 may allow instructions that are decoded out of order to be reordered efficiently. As previously noted, reordering instructions after out of order decoding is important to allow for dependency checking. As the examples above illustrate, valid bits 80 and empty bits 82 may be used in conjunction with the last-instruction-in-group bit of the instruction tag to simplify reordering. In the example above, each group could comprise up to sixteen instructions (using a 4-bit order field 62). When control unit 72 receives an instruction with an asserted last-instruction-in-group bit, control unit 72 may set the valid and empty bits for the remaining storage locations having index values within the current group. This effectively fills in the gaps created by groups having varying numbers of instructions.

Other methods for reordering are also possible. For example, instruction storage unit 74 may be configured as an array wherein each storage location stores an instruction and a pointer that points to the next instruction in program order. Instructions having an asserted last-instruction-in-group bit will have pointers that point to the first instruction in the next group.

Figure 8:
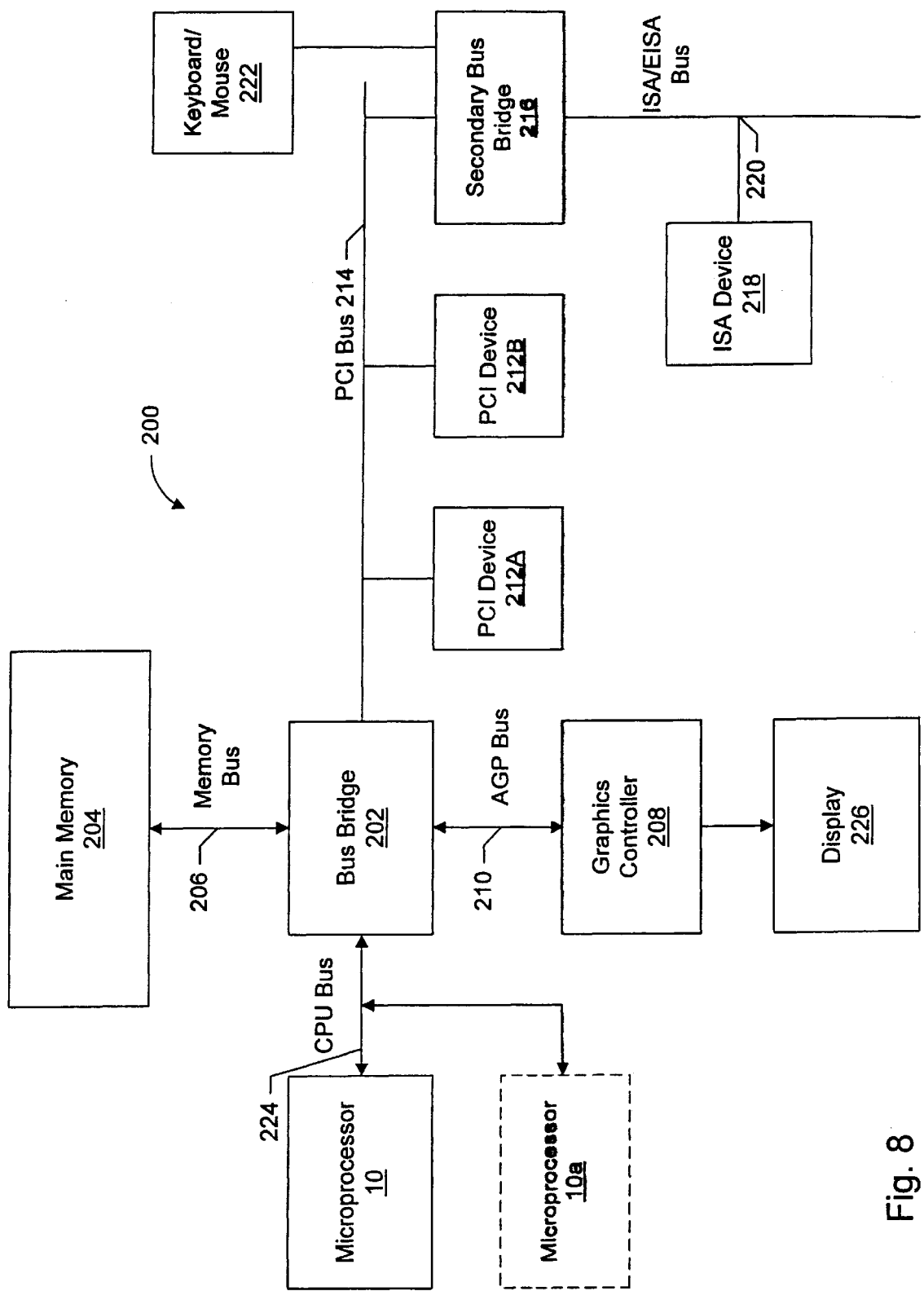
FIG. 8 is a diagram showing one embodiment of a computer system utilizing the microprocessor of FIG. 4.

Turning now to FIG. 8, a block diagram of one embodiment of a computer system 200 including microprocessor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 5) or may be connected to bus bridge 202 via an independent bus.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A microprocessor configured to decode instructions out of program order comprising:

an instruction cache configured to store instruction bytes, wherein said instruction cache is configured to receive a first fetch address and in response output a first group of instruction bytes corresponding to said first fetch address;

a tag generator coupled to said instruction cache, wherein said tag generator is configured to generate a first fetch tag for said first group of instructions bytes; and a first decode unit coupled to said tag generator and said instruction cache, wherein said first decode unit is configured to receive said first fetch tag and said first group of instruction bytes, wherein said first decode unit is configured to decode said first group of instruction bytes into one or more instructions, wherein said first decode unit is configured to generate an instruction tag for each instruction, and wherein said instruction tags are indicative of the program order of said one or more instructions.

2. The microprocessor as recited in claim 1, further comprising a second decode unit coupled to said tag generator and said instruction cache, wherein said second decode unit is configured to independently decode a second group of instruction bytes from said instruction cache while said first decode unit decodes said first group of instruction bytes.

3. The microprocessor as recited in claim 2, wherein said second decode unit is configured to generate an instruction tag for each instruction in said second group of instruction bytes.

4. The microprocessor as recited in claim 3, wherein said instruction tags are formed using said fetch tag.

5. The microprocessor as recited in claim 4, wherein said second group of instruction bytes occurs after said first group of instruction bytes in program order.

6. The microprocessor as recited in claim 5, wherein said second decode unit is configured to decode said second group of instruction bytes out of program order relative to said first group of instruction bytes.

7. The microprocessor as recited in claim 6 further comprising a reordering storage unit coupled to said first and second decode units, wherein said reordering storage unit comprises a plurality of storage locations, wherein said reordering storage unit is configured to receive said instructions from said decode units, wherein said reordering storage unit is configured to reorder said instructions to program order and store said instructions in said plurality of storage locations.

8. The microprocessor as recited in claim 7, wherein said reordering storage unit is also configured to receive said instruction tags, wherein said reordering storage unit is configured to reorder said instructions according to said instruction tags.

9. The microprocessor as recited in claim 8, further comprising a plurality of functional units coupled to said reordering storage unit, wherein said reordering storage unit is configured to issue a particular instruction to one of said plurality of functional units after all instruction before said particular instruction in program order have been decoded.

10. The microprocessor as recited in claim 9, further comprising a group of reservation stations, wherein each reservation station is coupled between said reordering storage unit and one of said plurality of functional units, wherein each reservation station is configured to receive an issued instruction from said reordering storage unit, store said issued instruction until said issued instruction is ready for execution, and then dispatch said issued instruction to a corresponding functional unit for execution.

11. The microprocessor as recited in claim 10, wherein said reservation stations are configured to dispatch said issued instructions out of program order.

12. A microprocessor configured to decode instructions out of program order comprising:

a cache;
a first decoder coupled to said cache, wherein said first decoder is configured to receive and decode a first plurality of instruction bytes; and
a second decoder coupled to said cache, wherein said second decoder is configured to receive a second plurality of instruction bytes from said cache, wherein said second decoder is configured to decode said second plurality of instruction bytes while said first decoder is decoding said first plurality of instruction bytes, wherein said second plurality of instruction bytes occur after said first plurality of instruction bytes in program order, and wherein said second decoder is configured to complete decoding said second plurality of instruction bytes before said first decoder is completed decoding said first plurality of instruction bytes; and
wherein said first and second decoders are configured to generate tags corresponding to each decoded instruction, wherein said tags are indicative of program order.

13. The microprocessor as recited in claim 12, wherein said second decoder is configured to receive and decode a third plurality of instruction bytes while said first decoder is decoding said first plurality of instruction bytes, wherein said third plurality of instruction bytes occur after said second plurality of instruction bytes in program order.

14. A method for decoding instructions out of program order comprising:

fetching a first group of instruction bytes from an instruction cache;
assigning a first fetch tag to said first group;
decoding said first group into a first number of instructions;
assigning an instruction tag to each of said first number of instruction;
issuing a particular instruction from said first number of instructions after all preceding instructions in program order have been decoded;
fetching a second group of instruction bytes from said instruction cache;
assigning a second fetch tag to said second group;
decoding said second group into a second number of instructions before said first group is completed decoding; and
assigning an instruction tag to each of said second number of instructions, wherein said second group occurs after said first group in program order.

15. The method as recited in claim 14, wherein said instruction tags are formed using said first fetch tag.

16. The method as recited in claim 14, further comprising reordering said first number of instruction and said second number of instructions using said instruction tags.

17. The method as recited in claim 16, wherein decoding said first portion and decoding said second portion occur in parallel.

18. The method as recited in claim 16, wherein decoding said second portion occurs before the decoding of said first portion.

19. A computer system comprising:

a first microprocessor comprising:
a cache configured to store a plurality of instruction bytes, wherein said cache is configured to receive a first fetch address and in response output a first group of bytes corresponding to said first fetch address;

a tag generator coupled to said cache, wherein said tag generator is configured to generate a first fetch tag for said first group of instructions bytes; and a first decode unit coupled to said tag generator and said cache, wherein said first decode unit is configured to receive said first fetch tag and said first group of instruction bytes, wherein said first decode unit is configured to decode said first group of instruction bytes into one or more instructions, wherein said first decode unit is configured to generate an instruction tag for each instruction, and wherein said instruction tags are indicative of the program order of said one or more instructions;

a CPU bus coupled to said microprocessor; and a modem coupled to CPU bus via a bus bridge.

20. The computer system as recited in claim 19, further comprising a second microprocessor coupled to said first microprocessor via said CPU bus.

* * * * *

UNITED STATES PATENT AND TRADEMARK OFFICE
CERTIFICATE OF CORRECTION

PATENT NO. : 6,212,621 B1
DATED : April 3, 2001
INVENTOR(S) : Rupaka Mahalingaiah It is certified that error appears in the above-identified patent and that said Letters Patent is hereby corrected as shown below:

<u>Title page,</u>
Below Item [75], Inventors, insert Item [73], Assignee as follows:

-- [73] Assignee: Advanced Micro Devices, Inc., Sunnyvale, CA. --.

Signed and Sealed this

Twenty-second Day of October, 2002

Attest:

JAMES E. ROGAN
Attesting Officer    Director of the United States Patent and Trademark Office